United States Patent [19]

Tingley

[11] Patent Number: 4,750,699
[45] Date of Patent: Jun. 14, 1988

[54] DIAL TEST INDICATOR HOLDER

[76] Inventor: John Tingley, 6166 Orange Ave., Long Beach,, Calif. 90805

[21] Appl. No.: 36,461

[22] Filed: Apr. 9, 1987

[51] Int. Cl.$^4$ .............................................. E04G 3/00
[52] U.S. Cl. .................................... 248/278; 248/284; 248/291; 248/DIG. 4
[58] Field of Search ............... 248/278, 284, 279, 291, 248/276, 280.1, DIG. 4, 231.7; 33/172 R, 172 D, 172 B

[56] References Cited

U.S. PATENT DOCUMENTS

| | | | |
|---|---|---|---|
| 1,059,948 | 4/1913 | Neberle | 248/278 X |
| 2,466,722 | 4/1949 | May | 248/276 |
| 2,909,351 | 10/1959 | Pratt | 248/DIG. 4 X |
| 3,096,962 | 7/1963 | Meijs | 248/276 |
| 3,442,478 | 5/1969 | Parapeti | 248/231.7 X |
| 3,858,836 | 1/1975 | Marcyan | 33/172 R X |
| 4,166,602 | 9/1979 | Nilsen et al. | 248/280.1 |
| 4,208,157 | 6/1980 | Guarino et al. | 33/172 D |
| 4,402,481 | 9/1983 | Sasaki | 248/276 |
| 4,411,402 | 10/1983 | Keller | 248/284 |

OTHER PUBLICATIONS

Rutland Tool & Supply; pp. 102–104.
L. S. Starret Co; pp. 335–341 (reprinted 1985).
Carman Tool & Abrasives Inc.; catalog No. 0886; pp. 171–174.
Quality Plus Tools; pp. 130–133.
Industrial Pipe & Steel Co; p. W8; 1987.

Primary Examiner—Ramon O. Ramirez
Attorney, Agent, or Firm—Charles H. Thomas

[57] ABSTRACT

An improved dial test indicator holder is provided which is adjustable in length and which may be utilized on a variety of machine tools. A quill clamp is provided for releasably gripping a spindle of machine tools such as milling machines, drilling machines, jig bores, horizontal boring mills and N.C. mills. In addition, the dial test indicator holder may be connected directly without a quill clamp to height gauges, collet holders and magnetic bases. The main body of the dial test indicator holder of the invention is formed of a plurality of main body links each comprised of parallel, separated body link elements. The main body links are connected by intermediate links utilizing a plurality of releasable fastener assemblies. Main body links may be removed and added by manually releasing and disengaging the fastener assemblies to acheive a desired overall length. Alternative terminal couplings and test indicator couplings are provided to accommodate different test indicators having different connections and to accommodate different machine tools and measuring gauge mounts.

16 Claims, 2 Drawing Sheets

DIAL TEST INDICATOR HOLDER

BACKGROUND OF THE INVENTION

1. Field of the Invention

The present invention is related to an improved dial test indicator holder designed for use with machine tools.

2. Description of the Prior Art

Dial test indicators are utilized in the machine tool industry for performing a variety of measurements where precise machine cutting, boring, milling and other machining operations are conducted. Dial test indicators are used to ascertain the concentricity of positioning of a work piece relative to a spindle center line, to align the edge of a work piece with the longitudinal or transverse movement of a machine table, and to check perpendicularity of spindle center lines relative to the surface of a table. Other types of dial test indicators are utilized in height gauges in order to ascertain the uniformity of height of a machine tool relative to a work piece as measured at different points on the work piece.

A dial test indicator is employed to considerable advantage when it is mounted in a holder that can be attached to the spindle or collet of a machine tool, such as a milling machine. The spindle or collet of such a machine tool is generally referred to in the industrial machining industry as a quill. A dial test indicator holder typically employs a quill clamp, which is a generally C-shaped clamp that is fastened to the quill in a plane perpendicular to the quill axis. A dial test indicator holder normally has an articulated arm that extends from the quill clamp toward a work piece and carries at its extremity, remote from the quill, a dial test indicator. Manual rotation of the quill will carry the dial test indicator holder and the dial test indicator in rotation about the quill axis. Deflection of the needle of the dial test indicator is observed to detect eccentricity of boring or milling, and variations in height of a surface of a work piece or variations in the alignment of the edge of a work piece. A dial test indicator holder of the type described has a significant advantage in that the necessary tests for precision in machining can be performed without removal of a working implement, such as a drill bit, milling bit or other tool, from the collet or spindle of a machine tool. This avoids errors in machining which would otherwise occur due to minute variations in positioning that inevitably arise when a tool bit is removed from and reinserted into a chuck, collet or bit holder. One conventional dial test indicator holder is depicted and described in U.S. Pat. No. 3,442,478 and is sold commercially as the Indicol holder.

The Indicol holder employs a quill clamp and articulated arms that extend from the quill clamp to carry the dial test indicator. One of the arms may be adjusted in length by virtue of a sliding connection with the other arm. Releasable fasteners allow the effective length to be adjusted up to a maximum length as dictated by the maximum effective length of the adjustable arm.

The Indicol holder, and other conventional dial test indicator holders, have several disadvantages. Specifically, the effective length to which the articulated structure may be lengthened is limited to the length of the adjustable arm. If the adjustable arm is excessively long, conventional holders may not be utilized in close quarters, as the excess reach of the adjustable arm beyond the connecting joint will often interfere with the structure of the machine tool and surrounding, immovable structures when the quill is rotated and when only a small effective length is required. Thus, it has been the practice to manufacture different sizes of test indicator holders to be utilized in different environments. Due to the highly precise nature of the measurements which must be achieved, however, the test indicator holders must be very accurately machined. Consequently, the purchase of several dial test indicator holders to afford different measurements represents a significant expense to a machine tool user.

Another disadvantage of conventional dial test indicator holders is that various of the component links of such holders lie in different, parallel planes which are located horizontally off center from a vertical plane passing radially through the axis of a quill to which the dial test indicator holder is connected. As a result, conventional dial test indicator holders tend to twist very slightly under the force of gravity. Even a very tiny twisting action in the dial test indicator holder can result in the manufacture of defective parts which fail to meet the precision tolerance standards required in many precision machining operations.

A further disadvantage of conventional dial test indicator holders is that they often exhibit excessive springiness which can lead to errors in measurements and hence errors in precision machining operations.

A further disadvantage of conventional dial test indicator holders is that they are essentially single holder devices. That is, a dial test indicator holder designed for coupling to a quill by means of a quill clamp can not be used as a height gauge to measure the distance of a machine tool from a work piece. Conversely, dial test indicator holders utilized in height gauges cannot be adapted for connection to the quill or spindle of a machine tool to assure concentricity.

SUMMARY OF THE INVENTION

It is the primary object of the present invention to provide an improved dial test indicator holder which remedies the shortcomings of conventional dial test indicator holders, as hereinbefore enumerated. The improved dial test indicator holder of the present invention may not only be connected to a rotatable quill of a machine tool, but also may be utilized in a height gauge and with magnetic bases. The dial test indicator holder of the present invention therefore has far greater versatility and application than the conventional dial test indicator holders which have heretofore been available.

A principal feature of the dial test indicator holder of the present invention is that it is constructed of a series of main body links connected together by intermediate connecting elements or links. Each of the main body links is comprised of a pair of parallel body link elements which are held in spaced separation from each other by the intermediate links or elements interposed therebetween. Main body links may be added and removed from the overall structure by engaging and disengaging releasable fasteners which are located at each joint formed between the main body links and the intermediate connecting links. Typically, two or three main body links are joined together by one or two intermediate connecting links. The main body links are preferably slightly greater than two inches in length and the intermediate connecting links are preferably about one and one-half inches in length. In many applications, however, the dial test indicator holder must span considerably greater distances than is possible with such a structure. With the dial test indicator holder of the invention, however, any number of additional main body links and intermediate connecting links may be joined to achieve whatever distance span is necessary. The releasable fasteners which join the links together in articulated fashion may be removed to allow the insertion of any number of additional main body links and intermediate connecting links. When the fasteners are retightened the dial test indicator holder of the invention may be formed into any rigid articulated configuration which is desired.

In one broad aspect the present invention may be considered to be an improved dial test indicator holder for use with machine tools. The holder is comprised of a plurality of main body links each having a pair of parallel body link elements. The holder also includes a terminal connecting link which may either be connected to a machine tool or to a mounting structure. The terminal connecting link has at least one end with flat, parallel surfaces and with a fastening eye defined therein, and adapted for insertion between the parallel body link elements of the main body links. The holder also includes at least one intermediate connecting link interposed between the body link elements of the main body links to join the main body links together to extend in articulated fashion from the terminal connecting link with the terminal connecting link inserted between the body link elements of a first main body link to a remote main body link located furthest from the terminal connecting link. The holder also includes means for carrying a test indicator connected to the remote main body link.

The preferred embodiment of the invention is an improved dial test indicator holder for use with machine tools and comprised of a quill clamp means for releasably gripping a spindle of a machine tool, and a plurality of main body links each comprised of a pair of parallel, body link elements. The preferred holder also includes at least one intermediate connecting means interposed between the body link elements of the main body links to join the main body links together to extend in articulated fashion from the quill clamp means with a first main body link located closest to the quill clamp means and a remote main body link located furthest from the quill clamp means. The preferred holder also includes means for carrying a test indicator connected to the remote main body link.

Preferably the indicator holder of the present invention is comprised of a plurality of fastening assemblies for forming joints between the intermediate connecting means and the main body links, whereby the fastening assemblies are releasable to allow the insertion and removal of the main body links and to allow the positions of the main body links to be adjusted relative to each other and relative to the intermediate connecting means. The fastening assemblies are tightenable to rigidly lock the main body links, the intermediate connecting means and the quill clamp means together.

Preferably, also alignable apertures are defined in all the body link elements and in the intermediate connecting means. Each of the main body links includes a first body link element and a second body link element. Also, each of the fastening assemblies is comprised of a plastic bushing seated against a first body link element in a main body link. The plastic bushing passes through an aperture in the first body link element and through an aligned aperture in an intermediate connecting means, and only partially through an aligned aperture in the second body link element in the same main body link. An internally threaded nut, preferably formed as a knurled fastener, is secured in the aligned aperture of the second body link element and is separated at a distance from the plastic bushing. Each fastening assembly also includes a screw which has a head that bears against the plastic bushing and the first link element and which has a threaded shank that extends through the plastic bushing and is threadably engaged with the nut secured in the second body link element. Preferably also, the screw head includes a knurled cap to permit the screw to be engaged and disengaged relative to the nut by manual manipulation.

The invention may be described with greater clarity and particularity by reference to the accompanying drawings.

DESCRIPTION OF THE DRAWINGS

FIG. 6 is an isolated plan view of an intermediate connecting link employed in the embodiment of FIG. 1.

DESCRIPTION OF THE EMBODIMENTS

Figure 1:
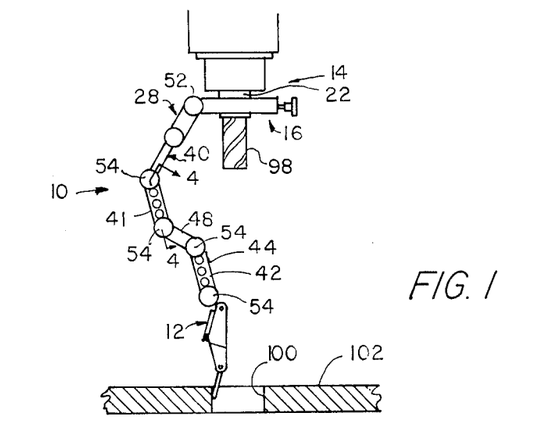
FIG. 1 is an elevational view illustrating use of a preferred embodiment of the dial test indicator holder of the invention.

FIG. 1 illustrates an improved dial test indicator holder 10 which carries a conventional dial indicator 12. The dial test indicator holder 10 is adapted for use with machine tools, such as a milling machine, a portion of which is indicated at 14 in FIG. 1. The component links, connectors and couplings of the dial test indicator holder 10 are constructed of aluminum so as to make the holder 10 as light in weight as possible.

Figure 2:
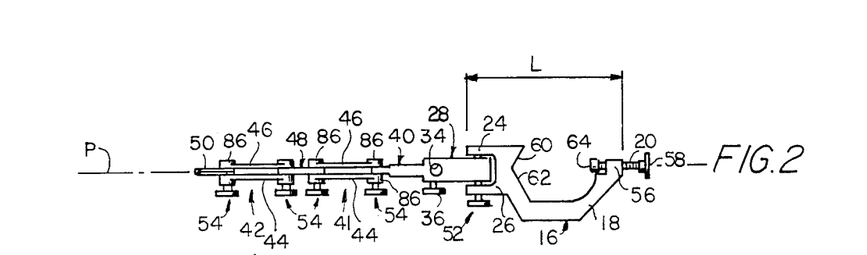
FIG. 2 is a plan view of a portion of the dial test indicator holder of FIG. 1.

The dial test indicator holder 10 is comprised of a quill clamp 16, illustrated in FIGS. 1 and 2. The quill clamp 16 has a generally C-shaped body 18 and includes a releasable spindle clamping screw 20 for releasably securing the quill clamp 16 to the spindle of a machine tool, such as the spindle 22 of the milling machine 14 as illustrated in FIG. 1. As depicted in FIG. 2, the quill clamp 16 has a pair of ears 24 and 26 located diametrically opposite the releasable clamping screw 20 and having transversely aligned apertures therethrough.

Figure 3:
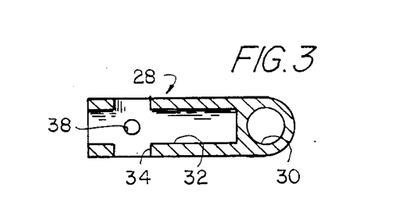
FIG. 3 is a sectional plan view showing the hinge element of the dial test indicator holder of FIGS. 1 and 2 in isolation.

The dial test indicator holder 10 also includes a hinge element 28 which has a transverse bore 30 therethrough and which is alignable with the transversely aligned apertures in the quill clamp ears 24 and 26. The hinge element 28 is illustrated in isolation and in cross section in FIG. 3. As illustrated in FIG. 3 the hinge element 28 also has a longitudinal bore 32 therein which is perpendicular to the transverse bore 30. The hinge element 28 also has a cross bore 34 therethrough which is perpendicular to and intersects the longitudinal bore 32. The hinge element 28 is also provided with a set screw 36, visible in FIG. 2, which has a disk shaped cap knurled on its edges and a threaded shank. The cap of the set screw 36 may be manipulated manually to advance and withdraw the threaded shank of the set screw relative to the hinge element 28 and in engagement with a tapped set screw bore 38, visible in FIG. 3. The set screw 36 is operable to immobilize objects which are alternatively inserted into the longitudinal bore 32 and into the cross bore 34.

The dial test indicator holder 10 is also comprised of a connecting link in the form of a connecting stem 40 which is releasably securable relative to the hinge element 28 by the set screw 36. The connecting stem 40 may alternatively be inserted into either the longitudinal bore 32 of the hinge element 28, or into the cross bore 34 therein. In either case the connecting stem 40 may be secured to the hinge element 28 by tightening of the set screw 36. The set screw 36 is provided with an allen screw plastic cap for finger tightening.

The dial test indicator holder 10 is also comprised of a plurality of main body links, two of which are indicated at 41 and 42 in FIG. 2. Each of the main body links is comprised of a pair of parallel separated body link elements 44 and 46. The holder 10 also includes at least one intermediate link 48 interposed between the body link elements 44 and 46 for joining adjacent main body links 41 and 42 together, as best illustrated in FIG. 2. The holder 10 also includes a test indicator coupling, such as the coupling 50 depicted in FIG. 2 and in FIG. 13. The coupling 50 is adapted to receive a mounting post projecting from the dial test indicator 12, so as to hold the dial test indicator 12 in the position depicted in FIG. 1, for example. The coupling 50 is adapted for interpositioning between the body link elements 44 and 46 of a main body link 42.

The dial test indicator holder 10 is also comprised of a plurality of releasable fastener assemblies 52 and 54 for releasably joining in articulated connection together the hinge element 28 to the ears 24 and 26 of the quill clamp 16, the first main body link 41 to the connecting link 40, another remote body link 42 to the test indicator coupling 50, and the main body links 41 and 42 to the intermediate link or links 48 between the connecting link 40 and the test indicator coupling 50.

The dial test indicator holder 10 is comprised of a plurality of modular elements some of which are depicted in FIGS. 1 and 2. The component elements of the dial test indicator holder 10 are coupled together in articulated fashion to enable the holder 10 to perform selected measurements and tests with respect to a machine tool of a particular configuration, such as the milling machine 14. However, it is to be understood that the dial test indicator holder 10 is extremely versatile, and employs a number of different component elements which may be employed alternatively or in addition to those depicted in FIGS. 1 and 2.

For example, the quill clamp 16 is an aluminum clamp geometrically shaped for attachment to cylindrical objects up to a maximum diameter of 1.875 inches. However, quills of some machine tools are of a greater diameter. Accordingly, the dial test indicator holder 10 is provided with a plurality of alternative quill clamps, which are all of the same construction as aforesaid, and each of which defines a different distance between the releasable clamping screw and the pair of ears. One such alternative quill clamp 16' is illustrated in cross section in FIG. 9. The quill clamp 16' contains all of the same structural and functional components as the quill clamp 16, and each of these corresponding structural and functional components is indicated by a primed reference number designation corresponding to the reference numbers of the component parts of the quill clamp 16. The several different quill clamps which are alternatively employed in the holder 10 are each adapted for alternative connection to the hinge element 28 to thereby accommodate different sizes of spindles 22.

With reference to FIG. 2, the quill clamp 16 has an overall length of 4.188 inches indicated at L. The corresponding length of the quill clamp 16' is 5.625 inches. The clamping screw 20 is threadably engaged in a tapped bore in the clamping screw mounting arm 56. The clamping screw 20 is one-quarter inch in diameter and is threaded at 20 unc. The length of the tapped bore in the clamping screw mounting arm 56, which transverses the thickness of that arm is 0.500 inches. The coresponding thickness of the clamping screw mounting arm 56' of the clamping quill 16' of FIG. 9 is 0.625 inches.

The clamping screw 20 has a shear lock, allen screw plastic, externally knurled, disk shaped cap 58 adapted for manual manipulation to advance and withdraw the clamping screw shank relative to the flange 56 with finger tightening. The shank of the clamping screw 20 is directed along a line which bisects a dihedral formed by the planar bearing surfaces 60 and 62. The interior end of the shank of the clamping screw 20 is equipped with a nylon pad 64 which prevents galling of the spindle 22 when the quill clamp 16 or 16' is tightened. Together, the bearing surfaces 60 and 62 and the pad 64 bear against the external surfaces of a quill of a machine tool, such as the spindle 22 of the milling machine 14, to firmly clamp the dial indicator holder 10 to the machine tool quill. The quill clamp 16 can be attached to quills or spindles as large as 1.875 inches in diameter, while the quill clamp 16' can be attached to quills or spindles as large as 3.00 inches in diameter. Thus, by selection of the appropriate quill clamp, the dial test indicator holder 10 may be mounted on the vast majority of machine tools utilized in the precision machining industry.

When the fastening assembly 52 is loosened, the hinge element 28 may be rotated through an arc of approximately 270 degrees. Since the hinge element 28 is equipped with the longitudinal bore 32 and the perpendicular, intersecting cross bore 34, the hinge element 28 may be attached directly to a main body link 42, or to connecting links, such as the connecting stem 40, as well as other connecting links of cylindrical cross section and of suitable size. The alternative accommodation of the cylindrical shafts of connecting links in either the longitudinal bore 32 or the cross bore 34 provides the dial test indicator holder 10 with two axis positioning of attachments. The set screw 36 can immobilize the shaft of a connecting rod inserted into either the longitudinal bore 32 or the cross bore 34.

Figures 9, 10, 11, 12, 14, 15:
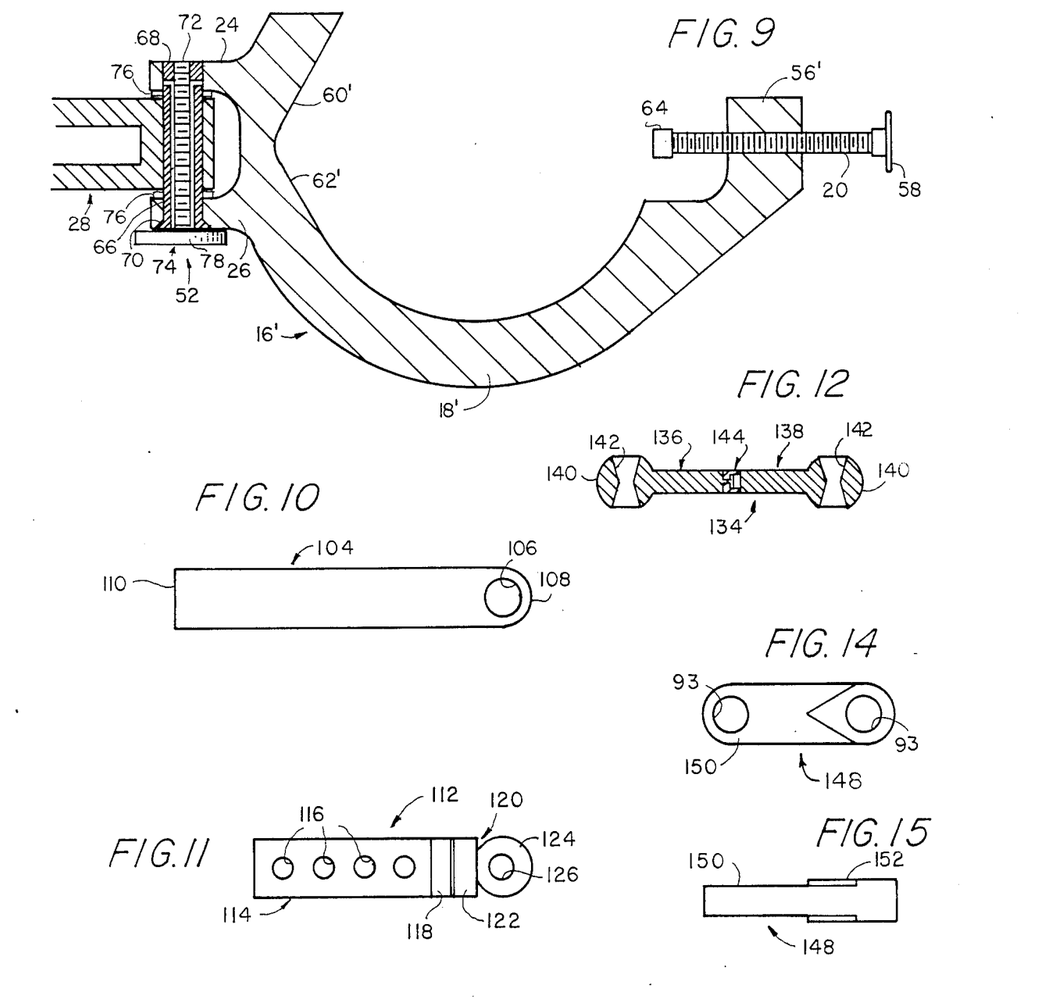
FIG 9 is a sectional plan view showing an alternative embodiment of the quill clamp illustrated in FIG. 2.
FIG. 10 is a plan view illustrating in isolation a height gauge adapter forming a component part of the preferred embodiment of the invention.
FIG. 11 is a plan detail illustrating in isolation an alternative height gauge adapter with a swivel.
FIG. 12 is a sectional elevational view showing in isolation an alternative intermediate connecting link to that depicted in FIG. 6.
FIG. 14 is top plan view showing in isolation another alternative intermediate connector having ends of different thickness.
FIG. 15 is a side elevational view of the intermediate connector of FIG. 14.

As best illustrated in FIG. 9, the hinge element 28 is attached to the ears 24 and 26 of either the quill clamp 16 or the quill clamp 16' by the fastening assembly 52. The ears 26 and 24 may be considered to be first and second ears. The fastening assembly 52 which releasably joins the hinge element 28 to the ears 26 and 24 of either the quill clamp 16 or the quill clamp 16' is comprised of a nylon plastic bushing 66 seated against the ear 26. The bushing 66 passes through close tolerance aligned holes in the ears 24 and 26 and through the close tolerance transverse bore 30 in the hinge element 28. As illustrated in FIG. 9, the bushing 66 passes entirely through the ear 26, through the transverse bore 30 of the hinge element 28, and only partially through the aligned hole in the ear 24. The bushing 66 stops short of the externally knurled, interiorally threaded nut or fastener 68 which is pressed into the aligned hole in the ear 24 from the far side and which is immobilized from rotation therewithin. The fastening nut 68 is separated a short distance from the plastic bushing 66. The external side of the aligned opening in the ear 26 is chamfered to receive the chamfered surface 70 of the head of the nylon bushing 66. The chamfered interface between the bushing 66 and the ear 26 prevents the bushing 66 from being pulled against the fastening nut 68 as the shank 72 of the lock screw 74 is tightened to immobilize the hinge element 28 relative to the quill clamp. The screw 74 has a shear lock allen screw plastic head cap 78 having a knurled rim for finger tightening that bears against the plastic bushing 66 and the first ear 26. The screw 74 has a threaded shank 72 that extends through the plastic bushing 66 and is threadably engagable with the fastener nut 68 secured in the second ear 24. Thrust washers 76 are provided between the quill clamp and the hinge 28 about the bushing 66 to prevent galling when the quill clamp and the hinge 28 are made of aluminum and to assist in achieving positive locking while still allowing movement at the pivot about the axis of the shank 72 of the lock screw 74.

In the arrangement depicted in FIG. 2, the hinge element 28 is interposed between the quill clamp 16 and the first main link 41, wherein one end of the hinge element 28 is rotatably mounted to the quill clamp 16 by the fastening assembly 52. As previously noted, the opposite end of the hinge element 28 has a longitudinal bore 32, depicted in FIG. 3.

Figure 7:
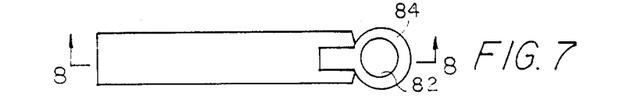
FIG. 7 is an isolated plan view of the connecting stem employed in the embodiment of FIGS. 1 and 2.
Figure 8:
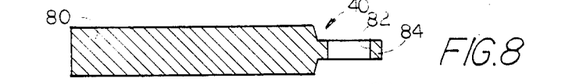
FIG. 8 is a sectional view taken along the lines 8—8 of FIG. 7.

The connecting stem 40 is interposed between the hinge element 28 and the first main link 41 and is illustrated in isolation in FIGS. 7 and 8. The connecting stem 40 has a cylindrical end 80 which may be inserted into either the longitudinal bore 32 or the transverse bore 34 in the hinge element 28. The nominal diameter of both the cylindrical end 80 of the connecting stem 40 and the bores 32 and 34 in the hinge element 28 is preferably 0.375 inches. The opposite end 84 of the connecting stem 40 is flattened to form a fastening eye 82 for releasable securement to the first main link 41 by one of the fastening assemblies 54.

Figure 4:
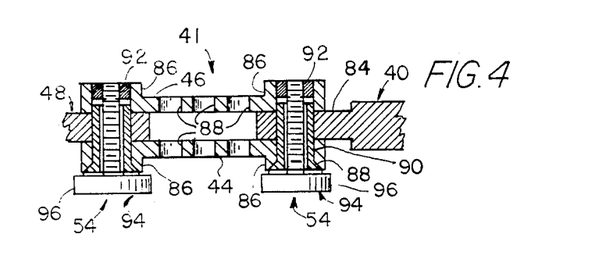
FIG 4 is a sectional detail taken along the lines 4—4 of FIG. 1.
Figure 5:
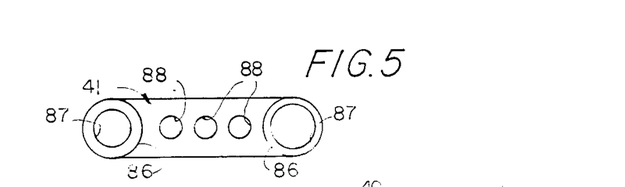
FIG. 5 is a top plan view showing a body link element in isolation.

The structures of the main body links and the fastening assemblies 54 are best illustrated in FIGS. 4 and 5. The main body links 41 and 42 are identical in construction, and the main body link 41 is illustrated in detail and in isolation in the drawings. The main body link 41 is comprised of a pair of parallel body link elements 44 and 46, as previously described. The body link elements 44 and 46 are of oblong construction with rounded ends and with raised annular bosses 86 protruding transversely outwardly at both ends. Between the bosses 86 the body link elements 44 and 46 are perforated with apertures 88 for purposes of weight reduction. Transverse apertures 87 each 0.3125 inches in diameter are defined through each of the bosses 86 in each of the body link elements 44 and 46. The body link elements 44 and 46 are identical to each other with the exception that the apertures 87 in the bosses 86 of the body link elements 44 are chamfered at a 45 degree angle so as to provide a seat for the correspondingly chamfered heads 88 of annular nylon bushings 90.

The intermediate connecting link 48 is illustrated in plan view in FIG. 6. The intermediate connecting link 48 is also of an oblong configuration and has transverse apertures 93 at both ends. Each of the apertures 93 is of a diameter of 0.3125 inches. The apertures 93 are spaced one inch apart, center to center. The intermediate connecting link 48 has a uniform thickness of one-quarter inch throughout.

The fastening assemblies 54 are provided for forming joints between the intermediate connecting link 48 and the main body links 41 and 42. The fastening assemblies 54 are releasable to allow the insertion and removal of main body links 41 and 42 and to allow the positions of the main body links 41 and 42 to be adjusted relative to each other and relative to the intermediate connecting link 48. The fastening assemblies 54 are tightenable to rigidly lock the main body links 41 and 42 and the intermediate connecting stem 40 together in the same manner that fastening assembly 52 locks the hinge element 28 to the quill clamp 16 or 16'.

The fastening assemblies 54 are illustrated in detail in FIG. 4. Each fastening assembly 54 is comprised of an annular plastic bushing 90 which has a chamfered frusto-conical head 88 that is seated against the corresponding chamfered rim of the apertures 87 in the bosses 86 of the body link elements 44. Each body link element 44 may be considered to be a first body link, while the body element 46 may be considered to be a second body link. The bushing 90 passes completely through the transverse aperture 87 in the body link element 44 and through the aligned aperture of the intermediate connecting link 48, the connecting stem 40, or the coupling element 50. The bushing 90 at the right hand side of FIG. 4 passes entirely through the aperture 82 in the connecting stem 40, while the bushing 90 at the left of FIG. 4 passes entirely through the aperture 92 in the intermediate connecting link 48. Each bushing 90 extends only partially through the corresponding aligned aperture in the body link element 46.

An externally knurled, interiorly threaded nut fastener 92 is pressed down into each aperture 87 of each body link element 46 and is immoblized from rotation therewithin. Each fastener nut 92 is separated a short distance from the interior extremity of the bushing 90 that is axially aligned therewith, as depicted in FIG. 4. Each fastening assembly 54 also includes a screw 94 which has a head 96 including a lock allen screw plastic cap for finger tightening. The shank of the screw 94 is threaded and extends through the annular plastic bushing 90 and is threadably engageable with the nut 92 that is secured in the link element 46. The frusto-conical head 88 prevents the bushing 90 from being pulled against the fastening nut 92. The main body links 41 and 42 and intermediate connecting links 48 may be removed or added to the dial test indicator holder 10 as appropriate by disengaging and reengaging the fastening assemblies 54.

The arrangement of the component elements illustrated in FIGS. 1 and 2 is appropriate for utilizing the dial test indicator holder 10 to support the dial test indicator 12 to measure the concentricity of a milling bit 98, for example, relative to a bore 100 in a work piece 102, as depicted in FIG. 1. However, the dial test indicator holder 10 is extremely versatile and may be used for other purposes as well. FIG. 10 illustrates a height gauge adapter 104 which is formed of a metal bar having a rectangular cross section and having a fastening eye 106 at one rounded end 108. The fastening eye 106 is 0.3125 inches in diameter. The height gauge adapter 104 is one-half inch wide and one-quarter inch in thickness and has an overall length of three inches between its opposite ends 108 and 110. These dimensions allow the height gauge adapter 104 to be readily received in commercially available height gauge mounting assemblies. When the dial test indicator holder 10 is used with a height gauge adapter, the connecting stem 40, the hinge element 28 and the quill clamp 16 are all removed from the main body link 41 and replaced by the height gauge adapter 104. The height gauge adapter 104 is connected to the first main body link 41 by a fastening assembly 54 with the bushing 90 and the screw 94 thereof extending through the aperture 106. The opposite end 110 of the height gauge adapter 104 is then attached to a height gauge mounting assembly, whereby said height gauge adapter serves as a terminal connecting link.

FIG. 11 illustrates an alternative form of height gauge adapter indicated at 112. The height gauge adapter 112 is comprised of a first piece which forms one end 114 which is of rectangular cross section one-half inch in width by one-quarter inch in thickness. Apertures 116 are defined in the end 114 to reduce the weight of the height gauge adapter 112. The height gauge adapter 112 has a cylindrical section 118 at one extremity of the end 114. The height gauge adapter 112 also includes a second, separate piece 120, which has a base 122 of cylindrical cross section and a flat, annular fastening loop 124 defining a fastening eye 126 therewithin. The separate pieces 120 and 114 are connected together at the interface between the cylindrical portions 118 and 120 by a conventional swivel connection. The swivel connection allows the dial test indicator holder 10 to be utilized at any angle relative to a height gauge mounting assembly stand.

Figure 13:
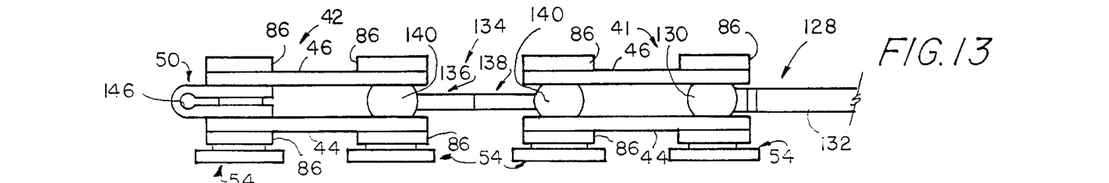
FIG. 13 is a sectional elevational view illustrating a portion of an alternative embodiment of the dial test indicator holder of the invention employing the intermediate connector of FIG. 12.

In a comparable fashion swivel connectors may be substituted for the connecting stem 40 and the intermediate connector 48 in the manner depicted in FIG. 13. FIG. 13 illustrates a system in which a swivel connecting stem 128 is employed in place of the rigid connecting stem 40. The swivel connecting stem 128 differs from the rigid connecting stem 40 in that instead of being formed with a rigid, fastening loop, it is formed of two separate pieces 130 and 132, connected together by a conventional swivel coupling.

Likewise, the intermediate swivel connector 134 may be substituted for the rigid intermediate connecting link 48. The intermediate connector 134 is depicted in section and in isolation in FIG. 12. The intermediate connector 134 is also formed of two separate pieces 136 and 138. Each of these two pieces has a spherical end 140 with an aperture 142 defined therethrough in the shape of a mirror image conical configuration, as depicted in FIG. 12. This mirror image conical or "hourglass" aperture configuration allows the swivel connector 134 to be oriented at various angles relative to the main body links 41 and 42. The spherical ends 140 with the mirror image conical apertures 142 provide for a ball joint connection of the intermediate connector 134 to the main body links 41 and 42. The separate pieces 136 and 138 are coupled together by a conventional swivel connection indicated at 144.

The ball joint swivel connecting stem 128 and the ball joint intermediate connector 134 are joined to the main body links 41 and 42 by the fastening assemblies 54 in the same manner as described in connection with FIGS. 2 and 4-8. However, since each of the spherical connectors 130 and 140 forms a ball joint connection, the main body links 41 and 42 can be manipulated to any angle of orientation desired. The ball joint connections at the sperical ends 130 and 140 can be clamped immobile relative to the main body links 41 and 42 by means of the fastening assemblies 54 in the manner previously described. The arrangement depicted in FIG. 13 allows the dial test indicator holder 10 to be manipulated into a wide variety of configurations.

FIG. 13 also illustrates in detail the interconnection of the test indicator coupling 50 to the main body link 42. The test indicator coupling 50 is formed as a generally U-shaped structure with an elongated slot leading to a central circular opening 146. The circular opening 146 is 0.156 inches in diameter. An opening 146 of this size is adapted to receive the mounting stem of a number of commercially available dial test indicators, such as the indicater 12.

FIGS. 14 and 15 illustrate yet another type of intermediate connector which is a step-up connector 148. Like the connector 48, the step-up connector 148 has apertures 93 each of one-half inch diameter formed therein. However, unlike the intermediate connector 48, the step-up connector 148 is of different thicknesses at its opposite ends. The end 150 of the step-up connector 148, like the intermediate connector 48, is one-quarter of an inch in thickness. However, the opposite end 152 is of a greater thickness, and may be, for example, 0.312 inches in thickness.

Figure 16:
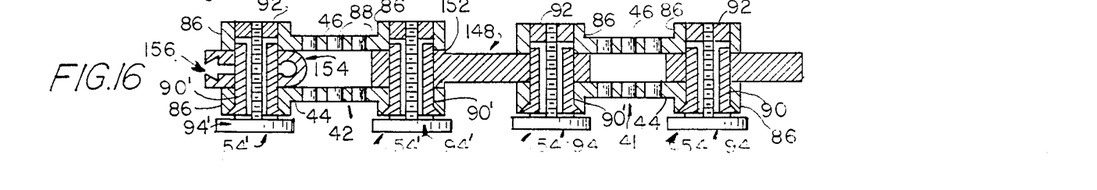
FIG. 16 illustrates the manner of utilization of the intermediate connector of FIGS. 14 and 15.

The purpose of providing an intermediate step-up connector 148 is best illustrated in FIG. 16. As illustrated, the step-up connector 148 is interposed between main body links 41 and 42 at the remote end of the dial test indicator holder 10 when a dovetail indicator clamp 154 is utilized. The dovetail indicator clamp 154 is a U-shaped structure, the ends of which define a dovetail channel indicated at 156. The dovetail indicator clamp 154, by itself, is a conventional structure which is employed as a means of attaching a dial test indicator holder to a dial test indicator having a dovetail tongue which fits into the dovetail channel 156. It should be noted, however, that the thickness of the dovetail indicator clamp 154 is greater than the thickness of the other major commercially available test indicator couplings 50 depicted in FIG. 12. By employing the step-up intermediate connector 148, the spatial separation between the body link elements 44 and 46 in the remote main body link 42 is increased to accommodate the increased thickness of the dovetail indicator clamp 154. Thus, the dial test indicator holder 10 of the invention may be employed to receive either a dial test indicator 12 having a post connection which fits into the aperture 146 in the test indicator coupling 50, or a dial test indicator having a dovetail tongue which fits into the dovetail channel 156 in the dovetail indicator clamp 154.

In the arrangement of FIG. 16 fastener assemblies 54' are provided to connect the remote main body link 42 to the dovetail indicator clamp 154 and to the end 152 of the step-up intermediate connector 148. The fastener assemblies 154' are identical in every respect to the fastener assemblies 154, except for the lengths of the bushings 90' and the shanks of the screws 94'.

In the arrangement of FIG. 16 the other intermediate connectors to the right of the step-up intermediate connector 148 can be of a uniform thickness throughout, which is the same thickness as the end 150 of the intermediate step-up connector 148. The step-up intermediate connector 148 is adapted for interchangeable alternation with the uniform intermediate connectors 48 between the remote main link 42, and the next adjacent main link located closest to the remote connector link, such as the connecting stem 40 or the height gauge adapter 104 or 112. This allows the remote main body link to alternatively accommodate different thicknesses of coupling means for carrying a test indicator.

The interchangeability of the component connectors and links and the ease with which the links and other component elements may be added and removed from the dial test indicator holder 10 provides the dial test indicator holder 10 with far greater versatility as contrasted with conventional dial test indicator holders. The dial test indicator holder 10 is adaptable for use with milling machines, drill presses, jig bores, lathes, and all other machine tools capable of holding a 0.375 inch diameter stem, as well as spindle quills up to three inches in diameter. The interchangeability of parts allows the dial test indicator holder 10 to be utilized with height gauges by employing a selected one of the height gauge adapters 104 or 112. Also, the holder 10 may be attached to a magnetic base by connecting the connector stem 40 to a magnetic base, rather than to a quill clamp.

In the preferred embodiment of the invention all of the component elements of the holder 10 lie along a common center line and in a single plane, indicated at P in FIG. 2. Since all of the component elements lie along a common center line there is less springiness in the holder 10, since no torsional moment is exerted about the center line due to the force of gravity. Because links can be serially added to the articulated structure of the holder, the holder 10 can swing in a much larger radius than is possible with conventional dial test indicator holders.

The fastener assemblies 52 and 54 are also superior to those employed in conventional dial test indicator holders. The relatively small number of pieces required to achieve a solid clamping action minimizes the difficulty in adding and deleting component links. The hinge element 28 also provides a distinct advantage by including both a longitudinal mounting bore and a cross bore, so as to allow biaxial mounting of the holder.

Also, the dial test indicator holder 10 is able to accommodate either post mounted or dovetail tongue mounted dial test indicators. Thus, the holder 10 of the invention can be used with virtually all commercially available dial test indicators.

The quill clamp configuration employed in the holder of the invention also provides significant advantages. While other types of quill clamps employ raised contact points, the surfaces 60 and 62 are flat, planar surfaces, thus allowing the quill clamp to be firmly secured to small diameter quills. Also, the two quill clamps described, used alternatively, will accommodate all commercially available machine tool quills with which dial test indicators are conventionally employed.

A further advantage of the invention is the lightweight construction and the rigidity of the joints when the fastening assemblies are tightened. Dial test indicator holders having a long effective length typically involve errors attributable to indicator drop. Indicator drop is the effect of gravity pulling down upon the indicator and upon the holder. The lightweight design, the rigidity of the joints, and the elimination of torsion about the center line of the preferred embodiment of the invention significantly minimize errors attributable to indicator drop.

The dial test indicator holder of the invention has a versatile applicability to numerous manufacturing, industrial, industrial repair and prototype engineering operations which are conducted in precision machining. Such functions are normally carried out in industrial machine shops, inspection laboratories, engineering test laboratories, calibration benches and in other comparable industrial environments.

Undoubtedly, numerous variations and modifications of the invention will become readily apparent to those familiar with dial test indicators and dial test indicator holders. Accordingly, the scope of the invention should not be construed as limited to the specific embodiment and the manner of implementation described herein, but rather is defined in the claims appended hereto.

I claim:

1. An improved dial test indicator holder for use with machine tools comprising;

a quill clamp means for releasably gripping a spindle of a machine tool, a plurality of main body links each comprised of a pair of parallel, first and second body link elements having alignable apertures therein, at least one intermediate connecting means interposed between said body link elements of said main body links and having apertures therethrough alignable with said alignable apertures in said body link elements, and disposed to join said main body links together to extend in articulated fashion from said quill clamp means with a first main body link located closest to said quill clamp means and a remote main body link located furthest from said quill clamp means, a plurality of fastening assemblies for forming joints between said intermediate connecting means and said main body links, wherein each of said fastening assemblies is comprised of a plastic bushing seated against a first body link element in a main body link and said bushing passes through an aperture in said first body link element, through an aligned aperture in an intermediate connecting means and only partially through an aligned aperture in the second body link element in the same main body link, an internally threaded nut secured in said aligned aperture of said second body link element and separated at a distance from said plastic bushing, and a screw which has a head that bears against said plastic bushing and said first body link element and which has a threaded shank that extends through said plastic bushing and is threadably engagable with said nut secured in said second body link element, whereby said fastening assemblies are releasable to allow the insertion and removal of said main body links and to alow the positions of said main body links to be adjusted relative to each other and relative to said intermediate connecting means, and said fastening assemblies are tightenable to rigidly lock said main body links, said intermediate connecting means and said quill clamp means together, and means for carrying a test indicator connected to said remote main body link.

2. An improved dial test indicator holder according to claim 1 wherein said screw head includes a knurled cap to permit said screw to be engaged and disengaged relative to said nut by manual manipulation.

3. An improved dial test indicator holder according to claim 1 further comprising a hinge element interposed between said quill clamp means and said first main body link wherein a first end of said hinge element is rotatably mounted to said quill clamp means by one of said fastening assemblies, and an opposite second end of said hinge element has a longitudinal bore that is directed toward and oriented perpendicular to said one of said fastening assemblies, a cross bore extending through said hinge element and intersecting said longitudinal bore, and set screw means in said hinge element operable to immobilize objects which are alternatively inserted into said longitudinal bore and into said cross bore.

4. An improved dial test indicator holder according to claim 3 further comprising a connecting stem interposed between said hinge element and said first main body link and which is of cylindrical cross section at one end and is inserted into one of said bores in said hinge element, and which defines a fastening eye at an opposite end for releasable securement to said first main body link by one of said fastening assemblies.

5. An improved dial test indicator holder according to claim 4 wherein said ends of said connecting stem are comprised of separate pieces connected together by a swivel.

6. An improved dial test indicator holder according to claim 1 further comprising a height gauge adapter formed of a metal bar having a rectangular cross section at one end and a fastening eye at an opposite end, whereby said height gauge adapter is connectable to said first main body link in place of said quill clamp means to allow said dial test indicator holder to serve as a height gauge.

7. An improved dial test indicator holder according to claim 6 wherein said ends of height gauge adapter are comprised of separate pieces connected together by a swivel.

8. An improved dial test indicator holder according to claim 7 wherein said opposite end of said height gauge adapter forms a ball joint.

9. An improved dial test indicator holder according to claim 1 wherein at least one of said intermediate connecting means is a step-up connecting means having different thicknesses at its opposite ends and there is at least one intermediate connecting means having a uniform thickness throughout that is the same thickness as that of one of said opposite ends of said step-up intermediate connecting means and said step-up intermediate connector means is adapted for interchangeable alternation with said uniform intermediate connector means, thereby allowing said remote main body link to alternatively accommodate different thicknesses of means for carrying a test indicator.

10. An improved dial test indicator holder according to claim 1 wherein at least one of said intermediate connecting means is a swivel connector comprised of a plurality of pieces connected together by a swivel.

11. An improved dial test indicator holder according to claim 10 wherein at least one of the ends of said swivel connector forms a ball joint.

12. An improved dial test indicator holder comprising
a quill clamp means having a releasable clamping means for releasably securing said quill clamp means to a spindle of a machine tool and defining a pair of ears diametrically opposite said releasable clamping means and having transversely aligned apertures therethrough,
a hinge element having a transverse bore therethrough alignable with said transversely aligned apertures in said quill clamp ears, and defining a longitudinal bore therein perpendicular to said transverse bore, a cross bore therein perpendicular to and intersecting said longitudinal bore, and set screw means,
a connecting link releasably securable to said hinge element by said set screw means,
a plurality of main body links each comprised of a pair of parallel separated body link elements,
at least one intermediate link interposed between said body link elements for joining adjacent main body links together,
test indicator coupling means adapted to receive a test indicator therein and adapted for interpositioning between said body link elements of a main body link, and a plurality of releasable fastener assemblies for releasably joining in articulated connection together said hinge element to said ears of said quill clamp means, one of said main body links to said connecting link, another remote main body link to said test indicator coupling, and said main body links to said intermediate links between said connecting link and said test indicator coupling.

13. An improved dial test indicator holder according to claim 12 wherein each of said pairs of body link elements includes a first and second body link element having aligned apertures extending therethrough, and each of said fastening assemblies which releasably joins said main body links as aforesaid is comprised of a plastic bushing seated against said first body link element in each body link element pair and said bushing passes through an aperture in said first body link element and only partially through an aligned aperture in said second body link element, an internally threaded nut secured in said aligned aperture of said second body link element separated at a distance from said plastic bushing, and a screw which has a head that bears against said plastic bushing and said first body link element and which has a threaded shank that extends through said plastic bushing, and is threadably engagable with said nut secured in said second link element.

14. An improved dial test indicator holder according to claim 12 wherein said pair of ears of said quill clamp means includes first and second ears having aligned apertures extending therethrough, and said fastening assembly which releasably joins said hinge element to said ears of said quill clamp means is comprised of a plastic bushing seated against said first ear in said pair of ears and said bushing passes through said transverse bore in said hinge element, and only partially through an aligned aperture in said second ear, an internally threaded nut secured in said aligned aperture of said second ear separated at a distance from said plastic bushing, and a screw which has a head that bears against said plastic bushing and said first ear and which has a threaded shank that extends through said plastic bushing and is threadably engagable with said nut secured in said second ear.

15. An improved dial test indicator holder according to claim 14 wherein said fastening assembly which releasably joins said hinge element to said ears of said quill clamp means is further comprised of thrust washers on opposite sides of said hinge element and between said hinge element and said ears of said quill clamp means.

16. An improved dial test indicator holder according to claim 12 further comprising a plurality of quill clamp means as aforesaid each defining a different distance between said releasable clamping means and said pair of ears and each adapted for alternative connection to said hinge element to thereby accommodate different sizes of spindles.

* * * * *